(12) United States Patent
Barkan et al.

(10) Patent No.: US 12,130,170 B2
(45) Date of Patent: Oct. 29, 2024

(54) BARCODE READER WITH OFF-PLATTER DETECTION

(71) Applicant: ZEBRA TECHNOLOGIES CORPORATION, Lincolnshire, IL (US)

(72) Inventors: Edward Barkan, Miller Place, NY (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/560,078

(22) Filed: Dec. 22, 2021

(65) Prior Publication Data

US 2022/0113183 A1 Apr. 14, 2022

Related U.S. Application Data

(63) Continuation of application No. 16/724,027, filed on Dec. 20, 2019, now Pat. No. 11,209,304.

(51) Int. Cl.
| | |
|---|---|
| *G01G 19/414* | (2006.01) |
| *G01G 19/415* | (2006.01) |
| *G01G 21/22* | (2006.01) |
| *G01G 21/28* | (2006.01) |
| *G06K 7/10* | (2006.01) |
| *G06T 7/13* | (2017.01) |

(52) U.S. Cl.
CPC ....... *G01G 19/4144* (2013.01); *G01G 19/415* (2013.01); *G01G 21/22* (2013.01); *G01G 21/283* (2013.01); *G06K 7/10722* (2013.01); *G06T 7/13* (2017.01)

(58) Field of Classification Search
CPC .. G01G 19/4144; G01G 19/415; G01G 21/22; G06T 7/13
USPC ...................................................... 235/462.43
See application file for complete search history.

(56) References Cited

U.S. PATENT DOCUMENTS

| | | | | |
|---|---|---|---|---|
| 5,058,691 A | * | 10/1991 | Sela ........................ | G01G 21/22 177/253 |
| 5,773,767 A | * | 6/1998 | Collins, Jr. ............ | G01G 19/56 177/127 |
| 6,085,979 A | * | 7/2000 | Maddox ............... | G07G 1/0045 235/383 |
| 6,830,186 B1 | * | 12/2004 | Nahar ................ | G01G 19/4144 235/462.14 |

(Continued)

*Primary Examiner* — Ahshik Kim
(74) *Attorney, Agent, or Firm* — Yuri Astvatsaturov (57) ABSTRACT

A barcode reader has a weigh platter and an off-platter detection assembly. The weigh platter is configured to measure a weight of an object and has a surface extending in a first transverse plane, a proximal edge, a first lateral edge extending non-parallel to the proximal edge, and a distal edge. The off-platter detection assembly includes a light emission assembly and a light detection assembly. The light emission assembly is configured to emit a collimated light beam along the first lateral edge, above the surface. The light diffusing barrier is positioned in a path of the collimated light beam and is configured to diffuse the light beam such that the light diffusing barrier appears to be illuminated when contacted by the light beam and appears not to be illuminated when not contacted by the light beam.

16 Claims, 7 Drawing Sheets

(56) References Cited

U.S. PATENT DOCUMENTS

| | | | |
|---|---|---|---|
| 7,367,499 B2* | 5/2008 | Jwo | G01G 19/4144 235/462.14 |
| 8,365,992 B2* | 2/2013 | Gregerson | G01G 19/4144 235/383 |
| 2003/0121974 A1* | 7/2003 | Blanford | G07G 1/0054 235/383 |
| 2010/0139989 A1* | 6/2010 | Atwater | G01G 23/3735 382/199 |
| 2021/0199488 A1* | 7/2021 | O'Donnell | G08B 7/06 |
| 2022/0270065 A1* | 8/2022 | Barkan | G06Q 20/208 |

* cited by examiner

BARCODE READER WITH OFF-PLATTER DETECTION

CROSS-REFERENCE TO RELATED APPLICATION

This application is a continuation of U.S. patent application Ser. No. 16/724,027, filed on Dec. 20, 2019, and incorporated herein by reference in its entirety.

FIELD OF THE DISCLOSURE

The present patent relates generally to barcode readers and, in particular, to barcode readers having off-platter detection.

BACKGROUND

One of the functions of a barcode reader having a weigh platter is to weigh produce or other products that are priced by weight in order to assist in determining the price of the produce or product. However, produce and products are varied in shape and size and there can be issues where part of the produce or product sits off of the weigh platter, resulting in incorrect weight measurement and, therefore, incorrect pricing. Therefore, there is a need to be able to identify when produce or products being weighed on a weigh platter of a barcode scanner extend off of the weigh platter during the weighing process to reduce or eliminate instances of incorrect weight measurement and pricing.

SUMMARY

In an embodiment, the present invention is a barcode reader configured to be supported by a workstation, the barcode reader comprising a weigh platter and an off-platter detection assembly. The weigh platter is configured to measure a weight of an object placed on the weigh platter and has a surface extending in a first transverse plane, a proximal edge, a first lateral edge extending non-parallel to the proximal edge, and a distal edge, opposite the proximal edge, extending non-parallel to the lateral edge. The off-platter detection assembly comprises a light emission assembly and a light diffusing barrier. The light emission assembly has a light source and is configured to emit a collimated light beam along the first lateral edge of the weigh platter, above the surface. The light diffusing barrier is positioned in a path of the collimated light beam and is configured to diffuse the light beam such that the light diffusing barrier appears to be illuminated when contacted by the light beam, indicating that there is no object extending across the lateral edge of the weigh platter, and appears not to be illuminated when not contacted by the light beam, indicating that there is an object extending across the lateral edge of the weigh platter.

In another embodiment, the present invention is a method of off-platter detection, comprising: emitting a collimated light beam from a light source along a first lateral edge of a weigh platter configured to measure a weight of an object placed on the weigh platter, above a surface of the weigh platter the weigh platter; and providing a light diffusing barrier in a path of the collimated light beam, the light diffusing barrier configured to diffuse the collimated light beam such that the light diffusing barrier appears to be illuminated when contacted by the collimated light beam, indicating that there is no object extending across the lateral edge of the weigh platter, and appears not to be illuminated when not contacted by the collimated light beam, indicating that there is an object extending across the lateral edge of the weigh platter.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

The examples disclosed herein relate to barcode readers having weigh platter assemblies and off-platter detection assemblies to identify when an object extends off of a lateral edge of the weigh platter of the weigh platter assembly. The examples herein use light emission assemblies emitting collimated light beams along one or more edges of the weigh platter and light diffusing barriers located in the path of the collimated light beam(s) that diffuse the collimated light beam and appear to illuminate when contacted by the collimated light beam. When the collimated light beam is uninterrupted (e.g., there is no object extending across the lateral edge of the weigh platter), the collimated light beam(s) would illuminate the light diffusing barrier(s). If the diffuser(s) are illuminated, it indicates to the user that the object is on the weigh plater correctly and can be weighed. If the diffuser(s) are not illuminated, it tells the user that the object is overhanging the lateral edge of the weigh platter and should not be weighed.

Figure 1:
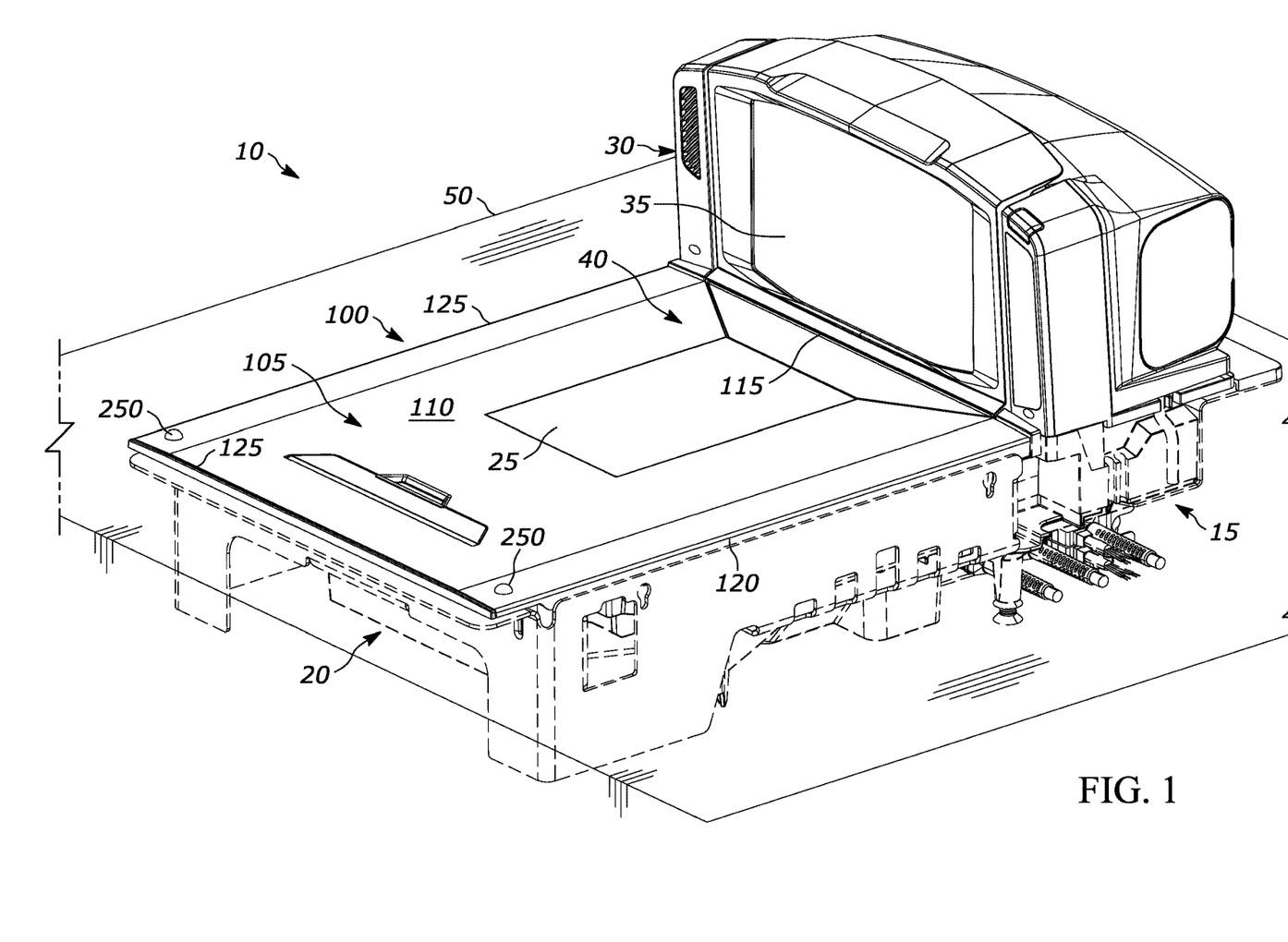
FIG. 1 illustrates a front perspective view of an example barcode reader supported by a workstation.

Referring to FIG. 1, an example barcode reader 10, such as the Zebra® MP7000 bioptic barcode reader, is shown and can be configured to be supported by a workstation 50, such as a checkout counter at a POS of a retail store, and includes a housing 15 and a weigh platter assembly 100. Housing 15 includes a lower housing 20 that houses weigh platter assembly 100 and an upper housing 30 that extends generally perpendicular to lower housing 20. Upper housing 30 includes a generally vertical window 35 to allow a first set of optical components positioned within upper housing 30 to direct a first field-of-view through vertical window 35. In addition, if barcode reader 10 is a bioptic barcode reader, lower housing 20 will include a generally horizontal window 25, which in the example shown is positioned in a weigh platter 105 of weigh platter assembly 100 to allow a second set of optical components positioned within lower housing 20 to direct a second field of view through horizontal window 25. The first and second fields of view intersect to define a product scanning region 40 of barcode reader 10 where a product can be scanned for sale at the POS.

Weigh platter assembly 100 includes a weigh platter 105 that is configured to measure the weight of an object placed on weigh platter 105. Weigh platter 105 has a surface 110 that is generally parallel to a top surface of workstation 50 and extends in a first transverse plane, a proximal edge 115, a first lateral edge 120, a second lateral edge 130, and a distal edge 125. In the example shown, proximal edge 115 is adjacent upper housing 30 and would be the edge furthest from a user of weigh platter assembly 100 and/or barcode reader 10. First lateral edge 120 extends non-parallel to proximal edge 115. Second lateral edge 130 also extends non-parallel to proximal edge 155 and is opposite first lateral edge 120. Distal edge 125 is opposite proximal edge 115, would be the edge closest to the user, and extends non-parallel to first lateral edge 120 and second lateral edge 130. In the example shown, weigh platter is generally rectangular and first lateral edge 120 and second lateral edge 130 are perpendicular to proximal edge 115 and distal edge 125 is perpendicular to first lateral edge 120 and second lateral edge 130 and parallel to proximal edge 115.

Figure 2:
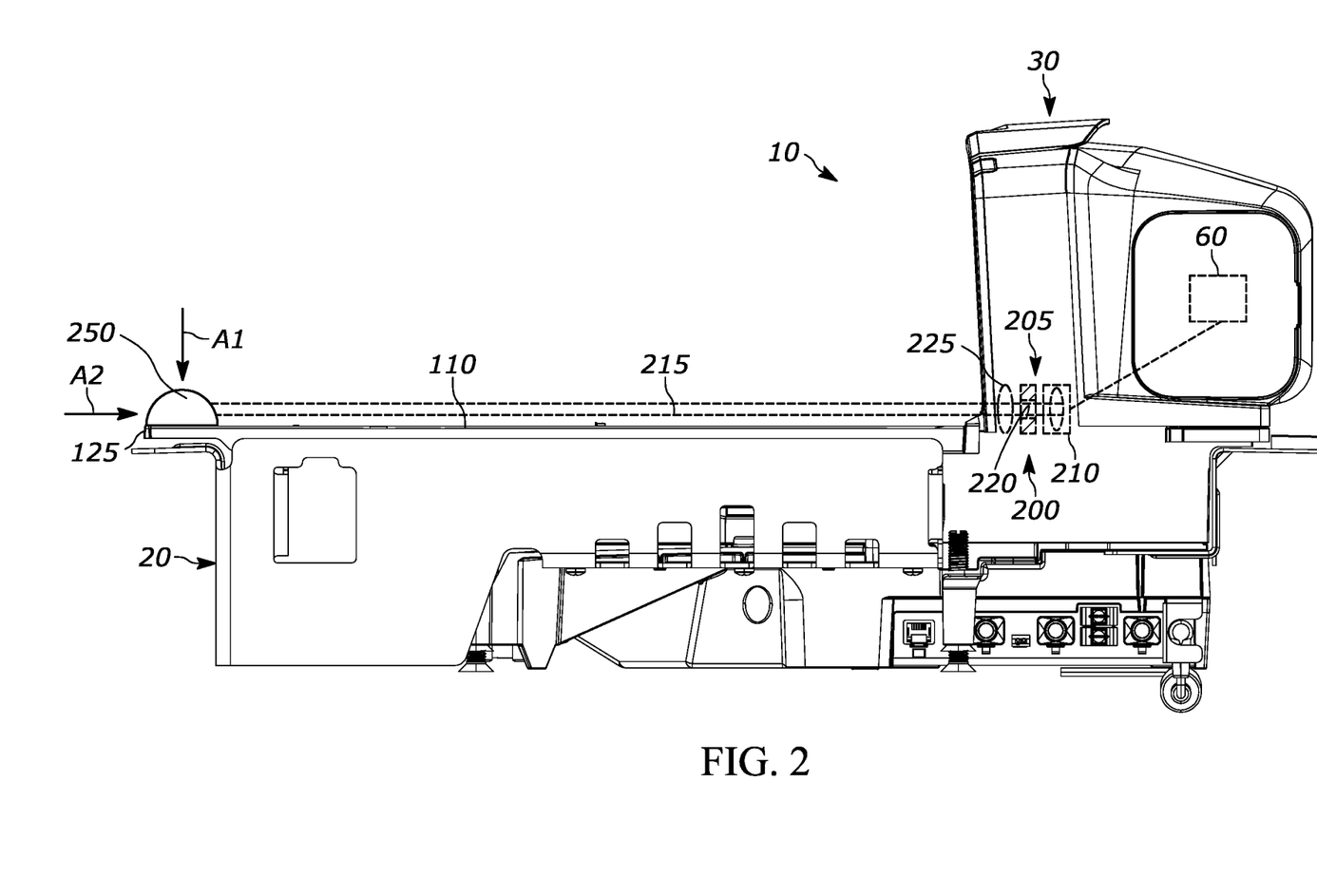
FIG. 2 illustrates a side view of the barcode reader of FIG. 1 with a first example off-platter detection assembly.
Figure 3:
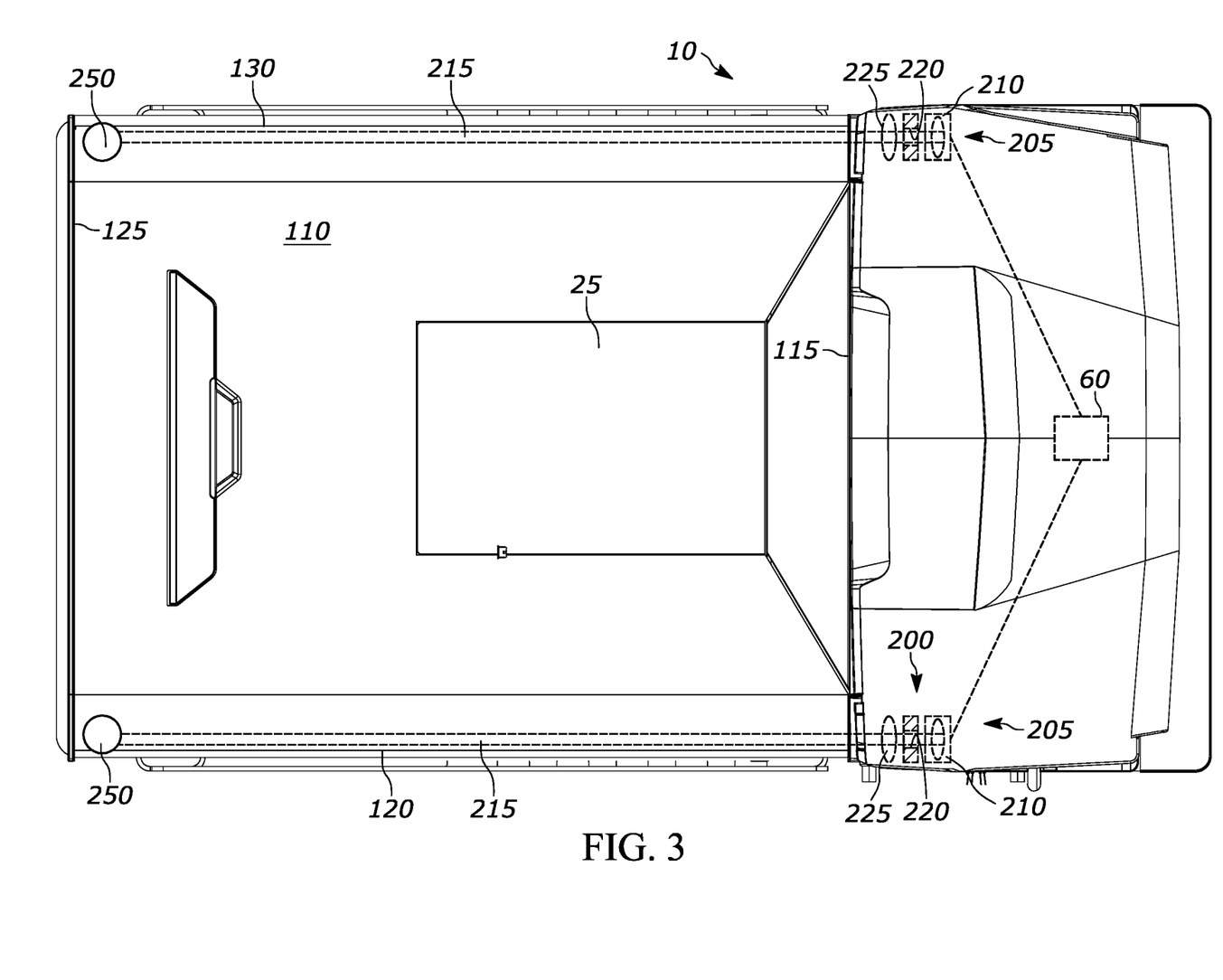
FIG. 3 illustrates a top view of the barcode reader of FIG. 2.

Referring to FIGS. 2-3, barcode reader 10 is illustrated with an example off-platter detection assembly 200 that generally includes a light emission assembly 205 and a light diffusing barrier 250. Light emission assembly 205 can be located within upper housing 30 of housing 15, has a light source 210, and is configured to emit a collimated light beam 215 from light source 210 towards distal edge 125, along first lateral edge 120, and above surface 110. Light source 210 could be a light emitting diode (LED) light source that is focused into a narrow beam, similar to an aiming dot used in scanners, a focused laser beam, or any other type of light source that can emit a collimated light beam sufficient to illuminate light diffusing barrier 250. Preferably, collimated light beam 215 emitted by light source 210 would be green in color, since that is the color that a user would most likely recognize as 'Go' or 'Proceed' and gives maximum contrast with the illumination emitted by barcode reader 10. Light emission assembly 205 can also include an aperture 220, which could be formed in a wall or protrusion of housing 15 or could be formed through another wall or structure that is part of weigh platter assembly 100, positioned in front of light source 210 to focus collimated light beam 215 into a narrow beam along first lateral edge 120 of weigh platter 105. A lens 225 can also be positioned in front of aperture 220 to increase the intensity of collimated light beam 215.

Figure 4A:
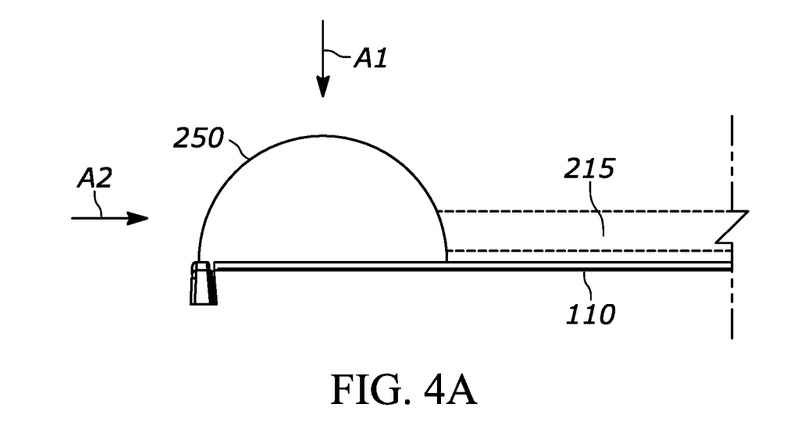
FIG. 4A illustrates an enlarged side view of an example light diffusing barrier.
Figure 4B:
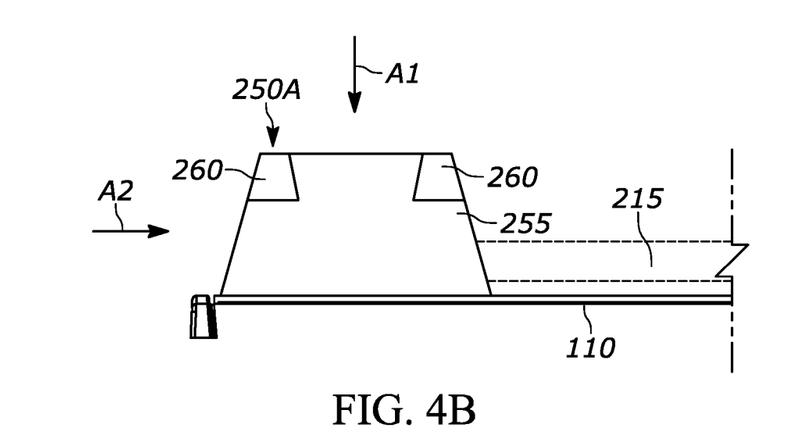
FIG. 4B illustrates an enlarged side view of another example light diffusing barrier.

Light diffusing barrier 250 is positioned in a path of collimated light beam 215 and is configured to diffuse collimated light beam 215 such that light diffusing barrier 250 appears to be illuminated when contacted by collimated light beam 215, indicating that there is no object extending across first lateral edge 120 of weigh platter 105, and appears not to be illuminated when not contacted by collimated light beam 215, indicating that there is an object extending across first lateral edge 120. In the example shown, light diffusing barrier 250 is positioned adjacent distal edge 125 and is attached to or integral with weigh platter 105. However, light diffusing barrier 250 can be positioned at other locations, as needed or desired, and can also be attached to or integral with housing 15 or workstation 50. Preferably, the illumination of light diffusing barrier 250 will be visible from both a first viewing angle (indicated by arrow A1) that is transverse to surface 110 of weigh platter 105 and looking down at surface 110 and from a second viewing angle (indicated by arrow A2) that is generally parallel to surface 110. For example, as shown in FIG. 4A, light diffusing barrier 250 can have a generally half-spherical shape, which would allow collimated light beam 215 to be diffused through light diffusing barrier 250 and viewable from any angle above surface 110. Alternatively, light diffusing barrier 250 could also have other shapes. For example, in FIG. 4B an alternative light diffusing barrier 250A is illustrated that has a generally trapezoidal shape and includes a translucent portion 255 that allows the passage of at least a portion of collimated light beam 215 to pass through light diffusing barrier 250 and be diffused and one or more opaque portions 260 that prevent the passage of light through opaque portion 260 of light diffusing barrier 250. Having both translucent and opaque portions 255, 260 allows collimated light beam 215 to be diffused through light diffusing barrier 250 and the illumination of light diffusing barrier 250 to be visible from first and second viewing angles A1, A2, while also preventing other extraneous light sources, such as the illumination system of barcode reader 10, from possibly being diffused and illuminating light diffusing barrier 250.

As can be seen in FIG. 3, off-platter detection assembly can also have a second light emission assembly 205 having a second light source 210 and second light diffusing barrier 250, as described above, that is configured to emit a second collimated light beam 215 along second lateral edge 130 of weigh platter 105 and above surface 110.

In addition, although off-platter detection assembly 200 has been described above as having the light emission assembly 205 within housing 15 at proximal edge 115 of weigh platter 105 and light diffusing barrier 250 at distal edge 125, it will be understood that the locations could also be reversed and light emission assembly 205 positioned adjacent distal edge 125 and light diffusing barrier 250 positioned at proximal edge 115 and adjacent to or within upper housing 30 of housing 15.

As also shown in FIGS. 2 and 3, light emission assembly 205 can also be operatively coupled to a controller 60 of barcode reader 10 and controller 60 can be configured to operate off-platter detection assembly 200 in various modes. For example, in a first mode of operation, controller 60 can send an instruction to light emission assembly 205 to emit collimated light beam 215 continuously, which would provide an indication of an off-platter event any time one of the light diffusing barriers 250 is not illuminated. In a second mode of operation, controller 60 can also be operatively coupled to weigh platter 105 and send an instruction to light emission assembly 205 not to emit collimated light beam 215 until controller 60 detects an object on weigh platter 105 and the measured weight of the object has settled. Once the measured weight has settled (after a positive dwell period), controller 60 can send an instruction to light emission assembly 205 to emit collimated light beam 215 to allow a user to determine if there is an off-platter event and to stop emitting collimated light beam 215 once controller 60 has detected removal of the object from weigh platter 105. This mode of operation conserves energy and prevents light diffusing barrier 250 from continuously illuminating and de-illuminating every time a non-weighing object is passed over weigh platter 105 to be scanned by barcode reader 10.

In a third mode of operation, controller 60 is again operatively coupled to weigh platter 105. However, in this mode of operation controller 60 can send an instruction to light emission assembly 205 to blink collimated light beam 215 once controller 60 detects an object placed on weigh platter 105 to provide an alert to and draw the attention of the user that light diffusing barrier 250 should be checked. Controller 60 can also generate a notification sound or alert to reminder the user to check light diffusing barrier 250. Once the measured weight of the object has settled (after a positive dwell period) controller 60 then sends an instruction to light emission assembly 205 to stop blinking collimated light beam 215 and to emit collimated light beam 215 continuously.

Figure 5:
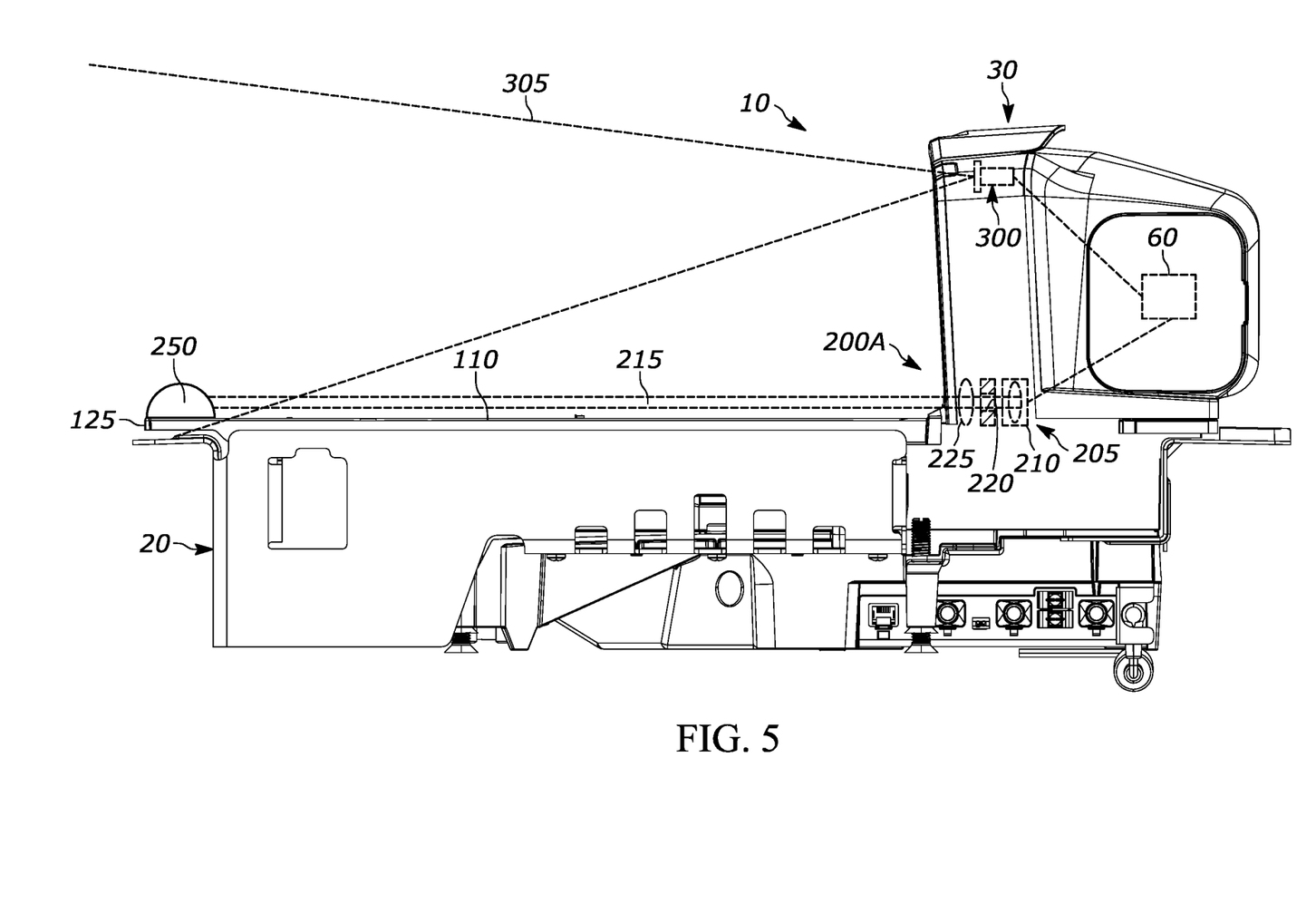
FIG. 5 illustrates a side view of the barcode reader of FIG. 2 with an example camera system.

Referring to FIG. 5, barcode reader 10 is illustrated with another example off-platter detection assembly 200A, which is the same as off-platter detection assembly 200 described above with the addition of a camera system 300 positioned within upper housing 30 and above light emission assembly 205. Camera system 300 has a field-of-view 305 that extends along weigh platter 105 and encompasses light diffusing barrier 250 and is in communication with controller 60. In this example, controller 60 is configured to receive images from camera system 300 and, based on the images received, determine if light diffusing barrier 250 appears to be illuminated or appears not to be illuminated. If controller 60 determines that light diffusing barrier 250 appears to be illuminated, controller 60 will allow the measured weight of an object on weigh platter 105 to be recorded by a host system operatively coupled to controller 60. If controller 60 determines that light diffusing barrier 250 appears not to be illuminated, controller 60 will prevent the measured weight of the object from being recorded by the host system and/or can provide an alert to the user that there is on off-platter event. In this example, the monitoring of light diffusing barrier 250 has been automated and is performed by controller 60, which removes the possibility that a user may not check light diffusing barrier 250 when an object is being weighed on weigh platter 105.

Figure 6:
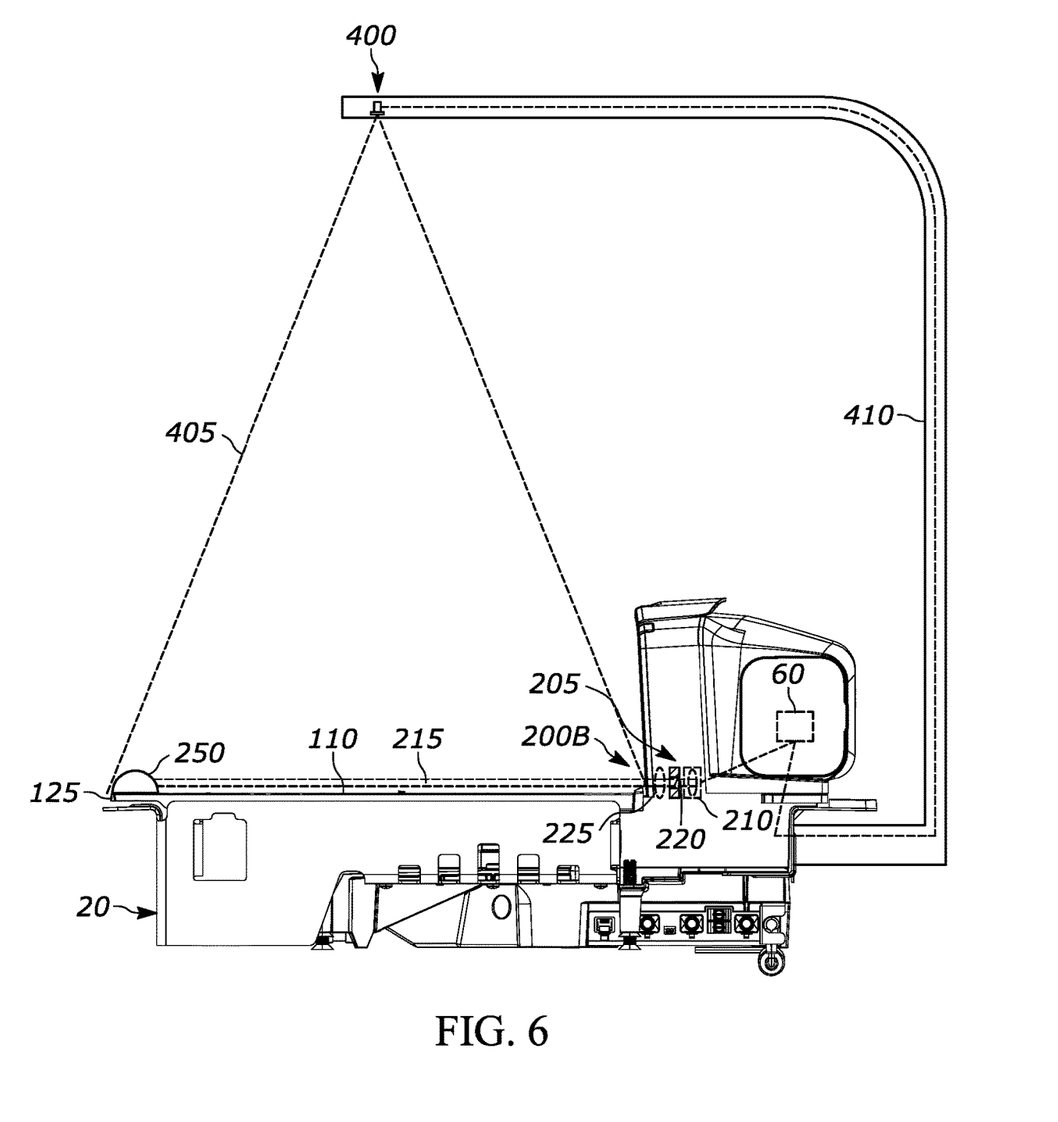
FIG. 6 illustrates a side view of the barcode reader of FIG. 2 with a an example overhead camera system.
Figure 7:
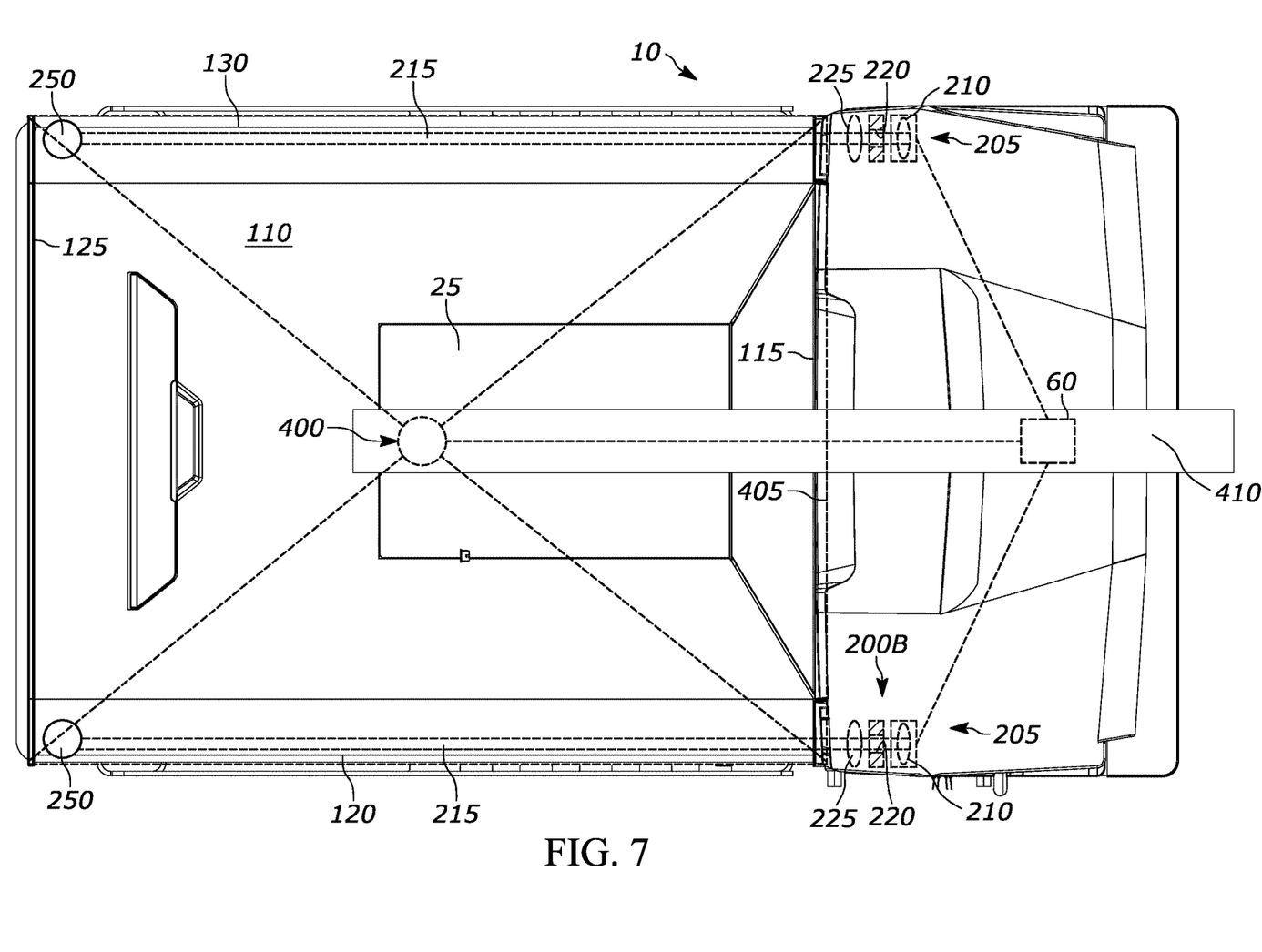
FIG. 7 illustrates a top view of the barcode reader of FIG. 6.

Referring to FIGS. 6-7, barcode reader 10 is illustrated with another example off-platter detection assembly 200B, which is the same as off-platter detection assembly 200 described above with the addition of an overhead camera system 400 positioned above and looking down on weigh platter 105. Overhead camera system 400 has a field-of-view 405 that encompasses surface 110 of weigh platter 105 and light diffusing barrier 250 and is in communication with controller 60. In the example shown, overhead camera system 400 is shown located in a gooseneck post 410 that extends from the back of housing 15 and above weigh platter 105, however, overhead camera system 400 could be located anywhere above weigh platter 105. For example, overhead camera system 400 could be located in a ceiling above barcode reader 10 and looking down on barcode reader 10, such as security cameras that are used with some point-of-sale systems. In this example, controller 60 is configured to receive images from overhead camera system 400 and, based on the images received, determine if light diffusing barrier 250 appears to be illuminated or appears not to be illuminated. If controller 60 determines that light diffusing barrier 250 appears to be illuminated, controller 60 will allow the measured weight of an object on weigh platter 105 to be recorded by a host system operatively coupled to controller 60. If controller 60 determines that light diffusing barrier 250 appears not to be illuminated, controller 60 will prevent the measured weight of the object from being recorded by the host system and/or can provide an alert to the user that there is on off-platter event. In this example, the monitoring of light diffusing barrier 250 has been automated and is performed by controller 60, which removes the possibility that a user may not check light diffusing barrier 250 when an object is being weighed on weigh platter 105.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s).

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A barcode reader configured to be supported by a workstation, the barcode reader comprising:
    a weigh platter configured to measure a weight of an object placed on the weigh platter and having a surface extending in a first transverse plane, a proximal edge, a first lateral edge extending non-parallel to the proximal edge, and a distal edge, opposite the proximal edge, extending non-parallel to the first lateral edge; and
    an off-platter detection assembly comprising:
        a light emission assembly having a light source, the light emission assembly configured to emit a light beam along the first lateral edge of the weigh platter, above the surface; and
        a controller configured to determine an off-platter condition responsive to (i) identifying an interruption of the light beam, and (ii) identifying a measured weight of the object resting at least partially on the weigh platter being settled for a positive dwell period,
    wherein the light emission assembly includes an aperture positioned in front of the light source to focus the light beam into a narrow beam along the first lateral edge of the weigh platter.

2. The barcode reader of claim 1, wherein the light beam emitted along the first lateral edge of the weigh platter is a narrow beam.

3. The barcode reader of claim 1, wherein the light beam emitted along the first lateral edge of the weigh platter is a collimated beam.

4. The barcode reader of claim 1, wherein the controller is configured to determine the off-platter condition responsive to identifying the interruption of the light beam by the object being weighed.

5. The barcode reader of claim 1, wherein the off-platter detection assembly further comprises:
    a second light emission assembly having a second light source, the second light emission assembly configured to emit a second light beam along a second lateral edge of the weigh platter, opposite the first lateral edge; and
    wherein the controller is further configured to determine the off-platter condition responsive to identifying an interruption of the second light beam by the object being weighed.

6. The barcode reader of claim 1, wherein the light source is one of a laser or a light emitting diode (LED) light source.

7. The barcode reader of claim 1, comprising a lens positioned in front of the aperture of the light emission assembly to increase an intensity of the light beam.

8. The barcode reader of claim 1, the controller is further configured to, responsive to determining the off-platter condition, send an instruction to the light emission assembly to blink the light source when the object is detected, and send an instruction to the light emission assembly to stop blinking the light source when the object is no longer detected.

9. A method of off-platter detection, comprising:
    emitting a light beam from a light source along a first lateral edge of a weigh platter, above a surface of the weigh platter the weigh platter configured to measure a weight of an object placed on the weigh platter;
    determining an off-platter condition responsive to (i) identifying an interruption of the light beam, and (ii) identifying a measured weight of the object resting at least partially on the weight platter being settled for a positive dwell period; and
    responsive to determining the off-platter condition, sending an instruction to the light emission assembly to blink the light source when the object is detected, and sending an instruction to the light emission assembly to stop blinking the light source when the object is no longer detected.

10. The method of claim 9, wherein emitting a light beam from a light source along a first lateral edge of a weigh platter includes emitting a narrow beam.

11. The method of claim 9, wherein emitting a light beam from a light source along a first lateral edge of a weigh platter includes emitting a collimated beam.

12. The method of claim 9, wherein the determining the off-platter condition responsive to the identifying the interruption of the light beam includes identifying the interruption of the light beam by the object being weighed.

13. The method of claim 9, further comprising:
emitting a second light beam from a second light source along a second lateral edge of a weigh platter, opposite the first lateral edge, above the surface of the weigh platter; and
further determining the off-platter condition responsive to identifying an interruption of the second light beam by the object being weighed.

14. The method of claim 9, wherein the light source is one of a laser or a light emitting diode (LED) light source.

15. The method of claim 9, comprising forming an aperture in front of the light source to focus the light beam into a narrow beam along the first lateral edge of the weigh platter.

16. The method of claim 15, comprising positioning a lens in front of the aperture to increase an intensity of the light beam.

* * * * *